United States Patent [19]

Tietze et al.

[11] 4,150,402
[45] Apr. 17, 1979

[54] METHOD AND APPARATUS FOR REDUCING THE EFFECT OF LASER NOISE IN A SCANNING LASER READ SYSTEM

[75] Inventors: Rudiger W. Tietze, Altadena; Leland D. Green, Sierra Madre, both of Calif.

[73] Assignee: Xerox Corporation, Stamford, Conn.

[21] Appl. No.: 785,372

[22] Filed: Apr. 7, 1977

[51] Int. Cl.² .................. H01J 39/12; G01J 1/32; H04N 1/04; H04N 1/40
[52] U.S. Cl. .................. 358/280; 250/205; 250/578; 358/285
[58] Field of Search .................. 358/280, 285, 282; 250/205, 578; 340/146.3 AG; 331/94.5 S

[56] References Cited
U.S. PATENT DOCUMENTS

| | | | |
|---|---|---|---|
| 3,626,092 | 12/1971 | Wilson | 358/280 |
| 3,858,056 | 12/1974 | Melamed | 331/94.5 S |
| 4,012,585 | 3/1977 | Chen | 358/285 |

*Primary Examiner*—Howard W. Britton
*Attorney, Agent, or Firm*—James J. Ralabate; Sheldon F. Raizes; Irving Keschner

[57] ABSTRACT

The output beam from a laser scans an input document and the signal reflected therefrom, corresponding to information on the document, is detected and amplified in a first amplifier and converted to an electrical signal. The laser beam is also sampled prior to scanning the document, the beam being detected and converted to an electrical signal which is then amplified in a second amplifier. The outputs of the first and second amplifiers are coupled to a gain control device. The gain versus control voltage characteristic of the device is selected such that the voltage from the second amplifier controls the voltage output from the device whereby noise present in the output laser beam which modulates the output signal from the first amplifier is substantially eliminated.

6 Claims, 8 Drawing Figures

METHOD AND APPARATUS FOR REDUCING THE EFFECT OF LASER NOISE IN A SCANNING LASER READ SYSTEM

BACKGROUND OF THE INVENTION

The use of lasers for scanning an input document and utilizing the reflections therefrom for information transmission have been known in the prior art. For example, the Telecopier® 200 facsimile transceiver manufactured by the Xerox Corporation, Stamford, Connecticut, utilizes a laser beam to scan an input document placed on a rotating member. The reflections from the document, which correspond to information formed thereon, is converted into electrical signals which may be transmitted to a remote facsimile transceiver device wherein the scanned information is reproduced on a recording medium.

U.S. Pat. No. 4,012,585, assigned to the assignee of the present invention, discloses a laser scanning system for scanning an input document placed on a stationary input platen and similarly converts the light reflections therefrom into electrical signals. The image is reproduced on a laser sensitive medium (such as a xerographic drum) at a remote location by modulating a laser beam in accordance with the electrical signals.

Although lasers produce light which is substantially coherent and monochromatic, the possibility exists that the output laser beam may have noise associated therewith. If this occurs, information contained in the reflections from the scanned input document would appear as a modulation of the corresponding reflected output electrical signal which would provide an inaccurate representation of the information being scanned. Therefore, what is desired is a simplified system which compensates for and minimizes the laser noise in the output electrical signal prior to its utilization in reproducing the scanned input document.

SUMMARY OF THE PRESENT INVENTION

The present invention provides method and apparatus for reducing the effects of a laser beam having noise associated therewith, the noisy laser beam being utilized to scan an input document.

In particular, the output beam from a laser, such as a helium-neon laser, scans an input document and the signal reflected therefrom, corresponding to information on the document, is detected and amplified in a first amplifier and converted to an electrical signal. The laser beam is also sampled prior to scanning the document, the beam being detected and converted to an electrical signal which is then amplified in a second amplifier. The outputs of the first and second amplifiers are coupled to a gain control device. The gain versus control voltage characteristic of the device is selected such that the voltage from the second amplifier controls the voltage output from the device whereby noise present in the output laser beam which modulates the output signal from the first amplifier is substantially eliminated.

It is an object of the present invention to provide method and apparatus for reducing the effect of laser noise in a scanning laser system.

It is a further object of the present invention to provide method and apparatus for reducing the effect of laser noise in a scanning laser read system.

It is still a further object of the present invention to minimize the noise level in a signal which corresponds to information in a scanned input document, the noise level resulting from the utilization of a noisy laser beam to scan the input document.

DESCRIPTION OF THE DRAWING

For a better understanding of the invention as well as other objects and further features thereof, reference is made to the following description which is to be read in conjunction with the accompanying drawing wherein.

DESCRIPTION OF THE PREFERRED EMBODIMENT

Figure 1:
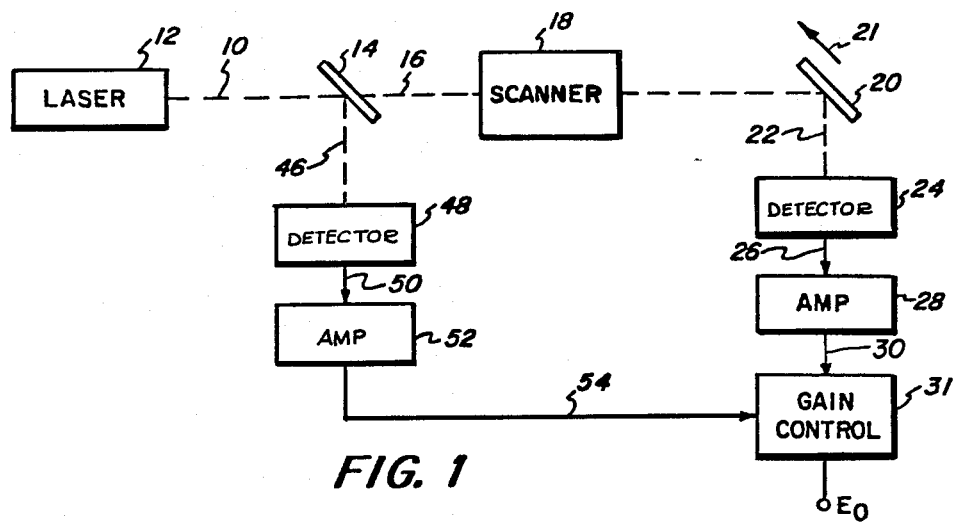
FIG. 1 is a simplified block diagram of the present invention.
Figure 2A:
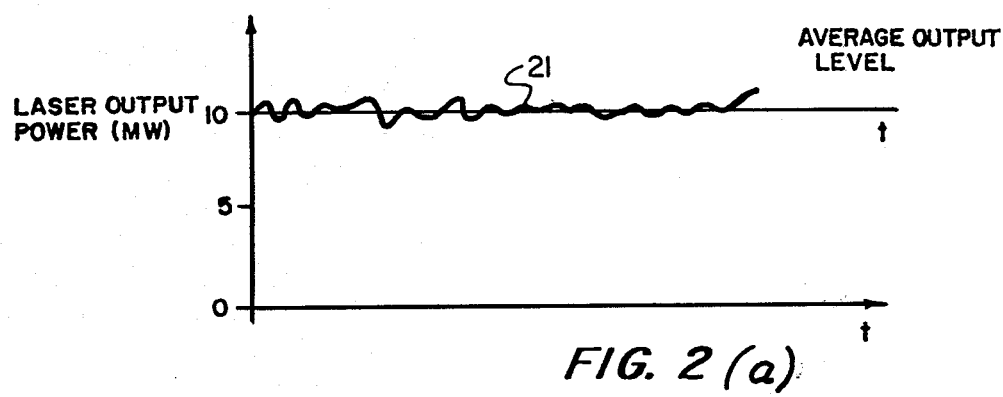
FIG. 2 illustrates representative signal levels at various points of the block diagram shown in FIG. 1.
Figure 2B:
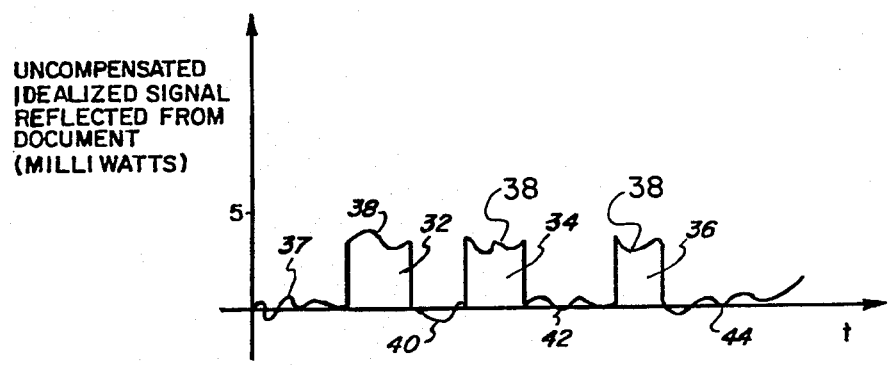
Figure 2:
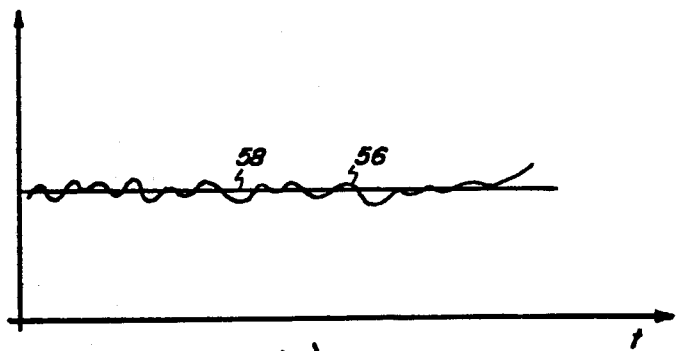
Figure 2:
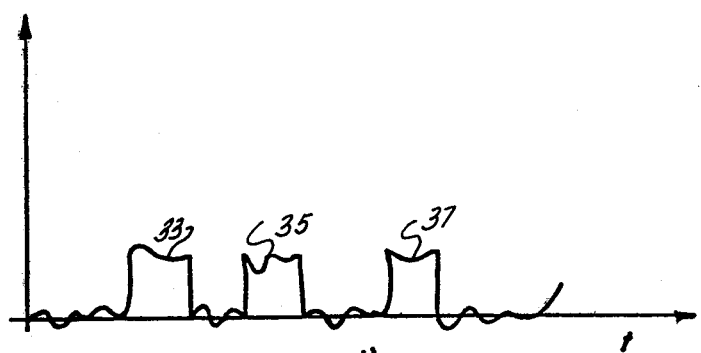
Figure 2:
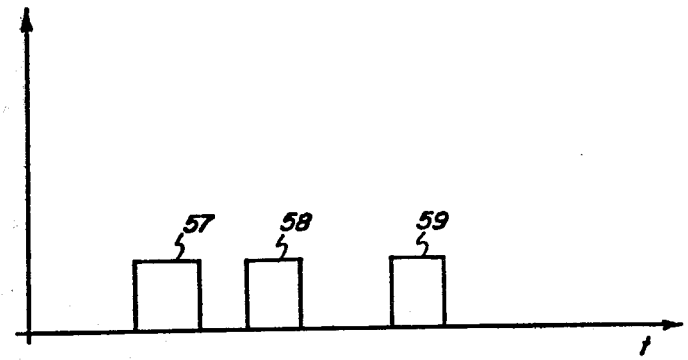

Referring now to FIG. 1, a block diagram of the present invention is illustrated. In particular, the light output beam 10 from a laser 12, such as a helium-neon laser which produces a red light beam, is applied to a partially silvered dichroic mirror 14. The transmitted portion 16 of the beam is incident on scanner element 18, which is preferably a rotating multifaceted polygon, which causes the beam 16 to scan input document 20 along an elemental line in a direction orthogonal to the plane of the figure. Means may be provided, such as that disclosed in aforementioned U.S. Pat. No. 4,012,585, to scan document 20 in the direction of arrow 21 to completely scan the surface of document 20. FIG. 2(a) shows a typical pattern measured at the output of laser 12 and shows the beam having an average power output level of, for example, 10 milliwatts and noise 21 superimposed thereon. The scanning beam from scanner 18 scans the information formed on document 20 and if document 20 is, for example, 50% reflective, the reflected signals 22 have half the signal strength (the noise being reduced the same amount). The reflected beam 22 from document 20 is incident upon a detector 24 which converts the incident light into an electrical signal on lead 26 which corresponds to the intensity of the light reflected from document 20. The signal on lead 26 is amplified by an amplifier 28, the resultant signal appearing on lead 30. The reflected light signal from document 20 essentially is that shown in FIG. 2(b) wherein light pulses 32, 34 and 36 at a level corresponding to light reflected from the white (or grey) areas of document 20 have modulated portions 38 corresponding to the noise pattern 21 shown in FIG. 2(a). The idealized black level of the signal shown in FIG. 2(b) which would be at zero, has in fact been modulated by the laser beam noise and is shown as portions 37, 40, 42 and 44. The output on lead 30 is applied to one input of gain control device 31 as shown. As set forth hereinabove, a portion of the beam 46 is reflected by mirror 14 and incident upon detector 48 which converts the light incident thereon into a corresponding electrical signal on lead 50. The electrical signal on lead 50 is amplified by amplifier 52 and applied to the other input of gain control device 31 via lead 54. The signal on lead 54 is represented by waveform in FIG. 2(c) and is essentially similar to that shown in FIG. 2(a) except that the noise pattern 56 and average output level 58 now correspond to voltage levels. The signal on lead 30 is shown in FIG. 2(d) and corresponds to that shown in FIG. 2(b) except that the signal is now in the form of a noise modulated series of voltage pulses 33, 35 and 37. In essence therefore, the signals shown in FIGS. 2(c) and 2(d) are applied to the respective inputs of gain control device 31. The output of gain control device 31 is shown in FIG. 2(e) and comprises a series of pulses 57, 58 and 59 with substantially no noise associated therewith. This is in comparison to the noisy signal shown in FIG. 2(d).

Figure 3:
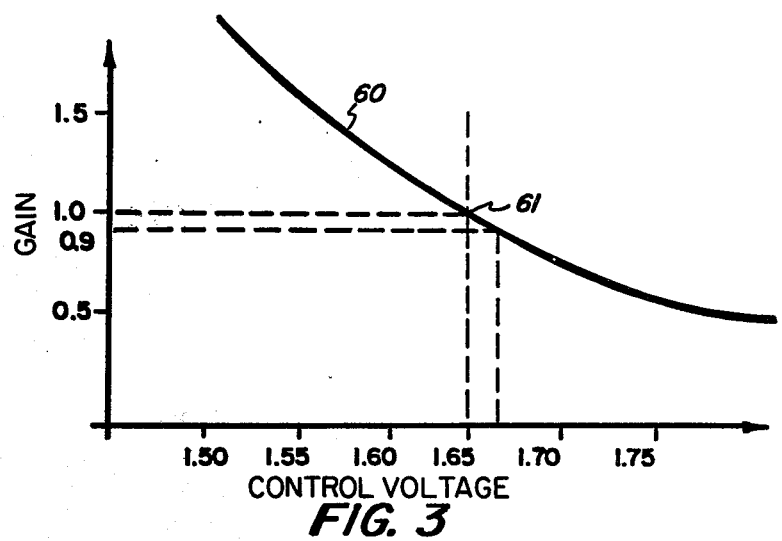
FIG. 3 is a typical characteristic showing the gain verses control voltage characteristics of a gain control device which may be utilized in the present invention.

In essence then, laser 12 scans the document 20 and the information signals reflected therefrom are detected and converted to a voltage signal by detector 24, the output signal on lead 26 being amplified by amplifier 28. A portion 46 of the laser light is detected and converted to an electrical signal by detector 48, the signal on lead 50 being amplified by amplifier 52. The output from amplifier 52 is utilized to control the gain of device 31 which may comprise a gain control amplifier which as will be set forth hereinafter, modulates the document signals on lead 30 in a manner such as to substantially eliminate the effect of a laser having a noisy output beam. An integrated circuit which may be utilized as device 31 is a linear integrated circuit module MC1445, manufactured by the Motorola Corporation and which essentially is a gate controlled two channel amplifier. The control voltage on lead 54 is adjusted such that correct amplitude and offset voltages are selected to match the voltage and gain characteristics of the selected device 31. A typical gain versus control characteristic 60 for the MC1445 is shown in FIG. 3, the gain of the device increasing as the control voltage decreases and vice versa as is required for noise compensation in the block diagram shown in FIG. 1. For the typical characteristic selected, a control voltage of 1.65 volts on lead 54 will provide a gain of 1. Therefore, the control voltage on lead 54 will follow characteristic curve 60 in a manner to compensate or offset the noise on lead 30. For example, if the laser at any instant is 10% brighter than its average output, the document signal from the amplifier 28 on lead 30 is also 10% larger. The control signal from amplifier 52 on lead 54 is selected to reduce the gain of device 31 by 10% to 0.9 which corresponds to a control voltage of approximately 1.67 volts as shown in FIG. 3. The output signal $E_o$ will then be corrected to a substantially noise free signal as shown in FIG. 2(e). Similarly, if the laser output at any instant is low, the gain of device 31 is increased in the appropriate amount, the control action being limited by how fast the device 31 can respond and to how accurately the control signal varies the gain of the gain control device 31.

Figure 4:
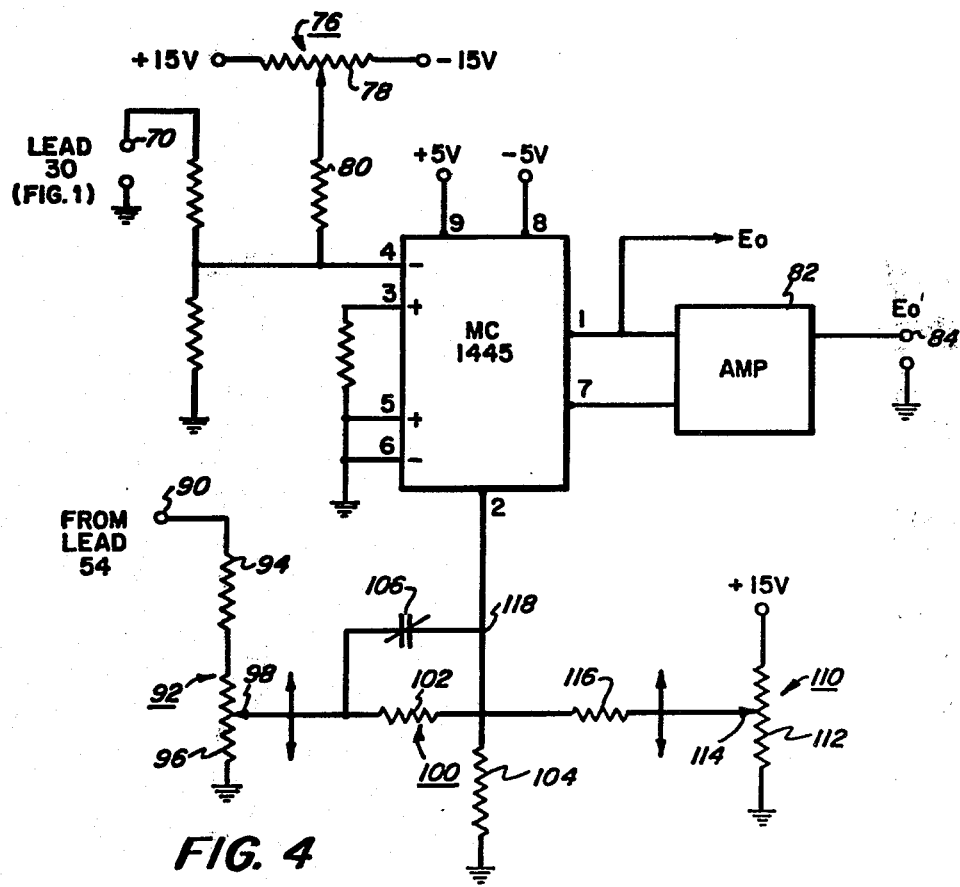
FIG. 4 is a schematic diagram of the gain control device shown in FIG. 1 and its associated input and output circuitry.

FIG. 4 shows how the MC1445, utilized in gain control device 31, is properly biased to provide the desired output signal $E_o$ shown in FIG. 2(e). The video signal on lead 30, which, it should be noted, may or may not be modulated by noise, is applied to terminal 70 of voltage divider comprising resistors 72 and 74. An offset compensator 76 comprising biased resistor 78 and resistor 80 is utilized to add a DC level to output signal $E_o$ if desired. It should be noted that compensator 76 is not required in the operation of the MC1445. The MC1445 has 8 pins associated therewith, pin 4 having a differential input from terminal 70 applied thereto and terminals 3,5 and 6 being grounded as shown. Terminals 8 and 9 have a bias voltage applied thereto ($\mp 5$ volts) to provide power to the device. The signal applied to pin 2 is the voltage control signal from lead 54 which will be explained hereinafter in more detail. The output signal $E_o$ may be taken from pin 1, or alternately, the output on pin 1 and the inverted output on pin 7 can be applied to an amplifier 82 in a push/pull arrangement to provide an amplified output EO' at terminal 84 if desired. The control signal from lead 54 is applied to terminal 90 of a voltage divider 92 which comprises resistors 94 and 96 and adjustable tap 98, the signal on lead 54 having both ac and dc components, the former due to laser caused noise in the signal. Tap 98 allows the ac and dc levels of the control signal to be adjusted to compensate for noise present in the video signal applied to terminal 70. The output from tap 98 is applied to divider circuit 100 comprising resistors 102 and 104, capacitor 106 increasing the high frequency noise components in the signal applied thereto. A potentiometer 110 comprising resistor 112 and adjustable tap 114 is coupled via lead resistor 116 to summing point 118 as shown. In effect, potentiometer 110 and tap 114 add a steady state level to the combined input at summing point 118 to place the MC1445 at the appropriate operating point via pin 2. Appropriate adjustment of potentiometer taps 98 and 114 are made initially to ensure that the control voltage cancels out substantially all the noise which modulates the video signal applied to terminal 70. Amplifier 82 is used to provide appropriate signal levels $E_o'$ for followon circuitry if desired.

Referring now to the operation of FIG. 4, the signal input to the linear integrated device MC1445 at terminal 70, may or may not have noise associated therewith. If the laser beam is essentially noise free, the device is arranged such that the gain control device 31 (which, again, comprises in the preferred embodiment linear integrated circuit MC1445 and the appropriate biasing circuits) provides a unity gain. In other words, the video signal on lead 30 will be passed through to output terminal pin 1 as signal $E_o$ without any amplification thereto. However, if noise is present on the video signal, the input on lead 54 applied to terminal 90 is such that the appropriate ac and dc variations therein are adjusted by tap 98 to correspond to the variations applied to lead 70 since both inputs have traversed different circuit paths to the device 31. Tap 114 also applies an adjustable DC level to summing point 118 and effectively operates to place the system at the desired operating point 61 as shown in FIG. 3. Once adjustable taps 98 and 114 have been appropriately adjusted to the proper operating point, no further adjustment need to be made. With the adjustments made, the gain control device 31 compensates for any noise present in the video signal due to noise in the input laser beam 10.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A method of reducing noise in a signal which corresponds to reflections from a document scanned with a laser beam having noise associated therewith comprising the steps of:

providing a laser beam, deflecting a portion of said laser beam to a first detector, the output of said detector being a first electrical signal corresponding to the light intensity of said detected laser beam, said first electrical signal being modulated in accordance with said noise, transmitting a portion of said laser beam to a scanner which scans said document along a predetermined path, detecting the laser beam reflected from said document and generating a second electrical signal corresponding to the light intensity of the reflected laser beam and having at least first and second levels associated therewith, said first and second levels being modulated in accordance with any noise present in the laser beam, and applying said first and second electrical signals to a gain control device, the gain of said device being controlled by said first electrical signal in a manner wherein the output thereof corresponds substantially to said second electrical signal with the noise modulations associated with said first and second levels being substantially removed.

2. The method defined in claim 1 wherein said first electrical signal reduces the gain of said gain control device when the value of said modulated noise is greater than the average power output level of said laser beam.

3. The method as defined in claim 1 wherein said first electrical signal increases the gain of said gain control device when the value of said modulated noise is less than the average power output level of said laser beam.

4. Apparatus for reducing the noise in an electrical signal which corresponds to reflections from a document scanned with a laser beam having noise associated therewith comprising:

means for generating a laser beam, first means for deflecting a portion of said laser beam to a first detector, the output of said first detector means being a first electrical signal corresponding to the intensity of said detected laser beam, said first electrical signal being modulated in accordance with said noise, said deflecting means also transmitting a portion of said laser beam to a scanner which scans said transmitted laser beam onto said document along a predetermined path, second means for detecting the laser beam reflected by said document, the output of said second detector means being a second electrical signal corresponding to the light intensity of the reflected laser beam and having at least first and second levels associated therewith, said first and second levels being modulated in accordance with any noise present in the laser beam, and gain control means responsive to said first and second electrical signals, the gain of said responsive means being controlled by said first electrical signal in a manner wherein the output thereof corresponds substantially to said second electrical sginal with the noise modulations associated with said first and second levels being substantially removed.

5. The apparatus as defined in claim 4 wherein said first electrical signal reduces the gain of said gain control means when the value of said modulated noise is greater than the average output level of said laser beam.

6. The apparatus defined in claim 4 wherein said first electrical signal reduces the gain of said gain control means when the value of said modulated noise is greater than the average output level of said laser beam.

* * * * *